United States Patent [19]

Borrelli et al.

[11] Patent Number: 5,537,505
[45] Date of Patent: Jul. 16, 1996

[54] TRANSPARENT GLASS-CERAMICS

[75] Inventors: Nicholas F. Borrelli, Elmira; Lauren K. Cornelius, Painted Post; Mark A. Newhouse; Paul A. Tick, both of Corning, all of N.Y.

[73] Assignee: Corning Incorporated, Corning, N.Y.

[21] Appl. No.: 431,045

[22] Filed: Apr. 28, 1995

Related U.S. Application Data

[63] Continuation-in-part of Ser. No. 344,978, Nov. 25, 1994, Pat. No. 5,483,628.

[51] Int. Cl.$^6$ .................................................. G02B 6/00
[52] U.S. Cl. ......................... 385/142; 385/144; 501/37; 501/79; 65/405; 65/390; 65/397; 372/6; 372/40
[58] Field of Search .............................. 65/405, 390, 397, 65/395, 404, 33.3, 33.7; 501/3, 37, 76, 79; 385/123, 141, 142, 144; 372/6, 39, 40, 41, 43, 45

[56] References Cited

U.S. PATENT DOCUMENTS

| | | | |
|---|---|---|---|
| 4,466,818 | 8/1984 | Brongersma | 65/33.3 |
| 4,619,798 | 9/1986 | Sarhangi et al. | 65/3.12 |
| 4,969,710 | 11/1990 | Tick et al. | 385/123 |
| 5,338,607 | 8/1994 | Kawamoto et al. | 428/373 |

OTHER PUBLICATIONS

Kaminiskii et al; Izvestiya Akademii Nauk SSSR, Neorganicheskie Materialy, vol. 21, No. 5, pp. 702–705, May 1985.
Wang et al; Applied Physics Letters, 63, (24), 3268–3270, Dec. 13, 1993.

*Primary Examiner*—John Ngo
*Attorney, Agent, or Firm*—William J. Chervenak

[57] ABSTRACT

The present invention is directed to the preparation of two groups of transparent glass-ceramics exhibiting high optical clarity and containing essentially only one crystal phase. The first group consists essentially, in cation percent, of

| | | | |
|---|---|---|---|
| $SiO_2$ | 20–35 | $PbF_2$ | 19–23 |
| $AlO_{1.5}$ | 10–20 | $YF_3$ | 3–7. |
| $CdF_2$ | 19–34 | | | and the second group consists essentially, in cation percent, of

| | | | |
|---|---|---|---|
| $SiO_2$ | 20–35 | $PbF_2$ | 15–25 |
| $AlO_{1.5}$ | 10–20 | $YF_3$ | 3–7 |
| $CdF_2$ | 21–31 | $ZnF_2$ | 3–7. |

These glass-ceramics may be used to fabricate optical waveguide fibers. Also when doped with certain rare earth elements, notably Pr, Er, and Dy, the glass-ceramic materials may be used to fabricate optical amplifiers and lasers.

18 Claims, No Drawings

TRANSPARENT GLASS-CERAMICS

FIELD OF THE INVENTION

This is a continuation-in-part of application Ser. No. 08/344,978, filed Nov. 25, 1994 and now U.S. Pat. No. 5,483,628.

The field of the invention is the production of transparent glass-ceramic articles. More specifically, the field of the invention is the production of fluoride-containing, transparent glass-ceramic articles exhibiting properties rendering them suitable for use in fabricating amplifier and laser fibers.

BACKGROUND OF THE INVENTION

It was first reported by M. Poulain and J. Lucas in "Verres Fluores au Tetrafluorure de Zirconium. Properties Optiques d'un Verre Dope au $Nd^{3+}$", Mat. Res. Bull. 10, 243–246 (1975) that a transparent glass was formed from a $ArF_4 \cdot BaF_2 \cdot NaF$ mixture fused at 800° C., rather than a new crystalline laser host material, which had been the object of their research. Their finding aroused immediate widespread attention because this previously unknown fluoride-based glass system offered the only practical amorphous material with infrared transparency extending beyond 6 microns. This desirable optical property is founded in the nonoxide composition of the glass and has comprised the principal basis for extensive research and development to the present day.

Investigators in the field appreciated that, because of the extended infrared transparency exhibited by the fluoride, they had the potential of forming optical fiber waveguides with losses of one to two orders of magnitude less than silica fibers. Furthermore, the low energy phonon spectra lead to relatively high quantum efficiencies for many rare earth metal transitions. Finally, when formulated with a sufficient content of rare earth metal ions, the glasses hold the promise of being attractive hosts for active fibers.

Among the more potentially useful of the fluoride-based glasses is the system of heavy metal fluoride glasses termed ZBLAN, those glasses consisting essentially of $ZrF_4$, $BaF_2$, $LaF_3$, $AlF_3$, and NaF. U.S. Pat. No. 4,674,835 (Mimura et al.) recites a representative formulation of SBLAN expressed in terms of mole percent

| $ZrF_4$ | 50–55 | $AlF_3$ | 2–4 |
| $BaF_3$ | 16–24 | NaF | 16–24 |
| $LaF_3$ | 3–5 | | | wherein the sum of the components totals 100.

Unfortunately, heavy metal fluoride glasses suffer certain undesirable attributes which have restricted their applications. Most notably, heavy metal fluoride glasses exhibit poor resistance to devitrification and Mimura et al. discuss the crystallization problems of ZBLAN and the light scattering problems resulting therefrom.

The great susceptibility of ZBLAN glasses to devitrification also generates problems in forming large preforms. Crystallization at the interface between the core and cladding during the production of the preform causes problems in the most commonly used methods for preparing a ZBLAN optical fiber. That is, heavy metal fluoride glasses are quite prone to inhomogeneous nucleation, the consequence of which being crystallization at the core and cladding interfaces, particularly during the drawing of the optical fiber. The resulting fibers are subject to serious scattering losses due to crystals in the fibers.

Devitrification of the glasses is aggravated when ions necessary to impart differences in indices of refraction to the core and cladding are added to the glass composition. Additional doping, for example with rare earth metal ions, also tends to reduce the stability of the glass. As a consequence of those problems, research has been continuous to find additives to the base ZBLAN composition which will reduce the tendency of the glass to devitrify and to increase the chemical stabilitythereof. Because that research has ameliorated the devitrification problem to a certain extent, but has not nearly eliminated it, other composition areas have been investigated wherein properties similar to those demonstrated by ZBLAN glasses can be secured, but where the problem of devitrification would be significantly reduced, most preferably totally eliminated.

One area of such research is reported by Y. Wang and J. Ohwaki in "New Transparent Vitroceramics Codoped with $Er^{3+}$ and $Yb^{3+}$ for Efficient Frequency Upconversion", Applied Physics Letters, 63(24), 3268–3270, Dec. 13, 1993. The specific vitroceramic (also called glass-ceramic) described therein had a base composition within the general fluoroaluminosilicate system and consisted essentially, expressed in terms of mole percent, of

| $SiO_2$ | 30 | $CdF_2$ | 20 |
| $AlO_{1.5}$ | 15 | $YbF_3$ | 10 |
| $PbF_2$ | 24 | $ErF_3$ | 1 |

The glass produced from that composition was heat treated at 470° C. to develop microcrystallites therewithin identified as $Pb_xCd_{1-x}F_2$, which the authors stated did not reduce the transparency of the body. The authors posited that the $Tb^{3+}$ and $Er^{3+}$ ions were preferentially segregated from the precursor glass and dissolved into the microcrystals upon heat treatment. The size of the microcrystallites was estimated by the authors to range about 20 nm (200 Å, .002 μm); that size being so small that light scattering loss was minimal. (Our investigations of the materials indicated that not only were the crystals of very small size, but also the interparticle spacing of the crystals was very small. ) The authors reported the upconversion efficiency of their products to be about 2 to 10 times as high as that measured on the precursor glass and other fluoride-containing glasses.

Based upon those findings by the authors, we hypothesized that if those glass-ceramics were as transparent as described, they might also be useful as hosts in amplifier and/or laser devices. Nevertheless, we realized that, if the glass-ceramic materials were to comprise viable hosts for 1.3 μm amplifier devices, Yb would have to be eliminated from the composition because Pr, which is customarilyutilized in materials designed for such devices, readily transfers electrons to Yb, that action resulting in the efficiency of the device being reduced.

Therefore, the principal objective of the present invention was to devise glass-ceramic materials comprising an improvement upon those described by Wang and Ohwaki.

A specific objective of the subject invention was to develop such glass-ceramic materials which, when doped with Pr, would exhibit excellent behavior as hosts in 1.3 μl μm amplifiers.

Another specific objective of the instant invention was to develop optical fiber waveguides comprising said glass-ceramic materials as the high refractive index core surrounded by a cladding of lower refractive index material.

SUMMARY OF THE INVENTION

In our initial laboratory investigations, we discovered that, when $YbF_3$ was removed from the Wang et al. composition, the resultant glass did not, upon heat treatment, crystallize in situ properly to produce relatively uniformly-sized, homogeneously dispersed, very fine-grained crystals to yield a transparent material. That is, the resulting material did not exhibit the controlled crystallization constituting the hallmark of a glass-ceramic body. X-ray diffraction studies of the material found no crystalline peaks when the precursor glass was exposed to temperatures within the 450°–500° C. range and further heat treatments did not yield a transparent glass-ceramic body. The occurrence of this phenomenon indicates that Yb plays a critical role in the formation of the crystal phase, a role not recognized by Wang et al.

Further laboratory studies disclosed that $YbF_3$ could be replaced without changing the basic crystallization characteristics or the crystal phase itself of the Wang et al. glass by either a combination of $YF_3$ with $CdF_2$ concentrations greater than that in the glass of Wang et al., or by a combination of $YF_3$ and $ZnF_2$. Founded upon those two discoveries, the two compositions listed below, expressed in terms of cation percent, were adopted as base glasse

| Glass I (A) | | | | Glass II (B) | | | |
|---|---|---|---|---|---|---|---|
| $SiO_2$ | 30 | $PbF_2$ | 22 | $SiO_2$ | 30 | $PbF_2$ | 17 |
| $AlO_{1.5}$ | 15 | $YF_3$ | 4 | $AlO_{1.5}$ | 15 | $YF_3$ | 4 |
| $CdF_2$ | 29 | | | $CdF_2$ | 29 | $ZnF_2$ | 5 |

Each of these base glasses produced a high optical clarity glass-ceramic material when doped with up to 900 ppm by weight of Pr. In addition, a high optical clarity glass-ceramic resulted when these base glasses were doped with up to 5 mole percent $LuF_3$.

The presence of at least 3 cation % $YF_3$ was determined to be required to assure the proper crystallization in situ to yield a transparent glass-ceramic material of optical clarity. Whereas both base glass compositions performed satisfactorily, the inclusion of $ZnF2$ results in somewhat improved glass melting and crystallization behavior; hence, glasses containing $ZnF_2$ are preferred. In $ZnF_2$ containing compositions the content of $CdF_2$ will range about 21–31 cation %. Where $ZnF2$ is absent, $CdF_2$ will vary between about 19–34 cation %. In ZnF2-containing compositions the concentration of $PbF_2$ will range about 15–25 cation %, whereas in the absence of $ZnF_2$, the $PbF_2$ content will be held between about 19–23 cation %.

In order to determine whether additions and/or substitutions could be made to the base glasses, various composition excursions were tested. The general approach adopted comprised substituting fluorides for fluorides and oxides for oxides, thereby maintaining a relatively constant anion ratio. Satisfaction of the following two fundamental criteria was required:

(1) the glass will crystallize in situ to a glass-ceramic containing essentially one crystal phase which, most preferably, is capable of accepting some rare earth metal doping; and (2) the glass-ceramic will display high optical clarity.

Those excursions illustrated that $B_2O_3$, $GeO_2$, $P_2O_5$, and, to a lesser extent, $TiO_2$ can be substituted into the oxide composition without encountering adverse effects upon the crystallization behavior of the glass. $GaF_3$, $HfF_4$, and $InF_3$ can be substituted into the fluoride composition area. Alkali metal and alkaline earth metal oxides and fluorides caused the glass melt to devitrify as it cooled. Compositions containing $LaF_3$ did not melt well, even at temperatures as high as 1200° C. Other rare earth metals demonstrated varying effects. For example, $LuF_3$ satisfied the above two criteria in amounts up to 5 mole %; $GdF_3$-containing compositions crystallized in situ with two crystal phases; and $CeF_3$-containing melts devitrified spontaneously during cooling. Finally, some CdS can be substituted for $CdF_2$.

As a result of our laboratory investigations, we have determined that precursor glasses essentially free from ZnO and $ZnF_2$ capable of being crystallized in situ to glass-ceramic materials displaying high optical clarity and containing essentially one crystal phase can be prepared from compositions consisting essentially, expressed in terms of cation percent, of

| $SiO_2$ | 20–35 | $PbF_2$ | 19–23 |
|---|---|---|---|
| $AlO_{1.5}$ | 10–20 | $YF_3$ | 3–7. |
| $CaF_2$ | 19–34 | | |

Where the precursor glass contains 3–7 cation % $ZnF_2$, glass-ceramic materials exhibiting high optical clarity and containing essentially one crystal phase can be prepared from compositions consisting essentially, expressed in terms of cation percent, of

| $SiO_2$ | 20–35 | $PbF_2$ | 15–22 |
|---|---|---|---|
| $ALo_{1.5}$ | 10–20 | $YF_3$ | 3–7 |
| $CdF_2$ | 21–31 | $ZnF_2$ | 3–7. |

By the expression "essentially free from", it is meant that the glass does not contain sufficient $ZnF_2$ to alter the chemical and/or physical characteristics of the glass. Preferably, $ZnF_2$ will be absent altogether, but this is not always possible because the glass batch materials (including cullet added to the batch materials) may contain it as an impurity.

By the expression "essentially one crystal phase", it is meant that the glass-ceramic does not contain a sufficient amount of a second crystal phase to alter the chemical and/or physical characteristics of the glass-ceramic, most particularly the optical clarity thereof. Again, most preferably, no amount of a second crystal phasewill be present. Where rare earth metal ions are included as substitutes for yttrium, they will be present in the crystal phase(s).

In the present specification and claims, the expressions "consisting essentially of" and "consist essentially of" are intended to permit the inclusion of minor amounts of inorganic components which do not detrimentally affect the characteristics of the precursor glass and/or those of the final glass-ceramic.

In both of the above composition intervals, up to 17 cation % total of the following components in the indicated proportions selected from the group consisting of 0–7% $BO_{1.5}$, 0–12% $GeO_2$, 0–7% $PO_{2.5}$, 0–3% $TiO_2$, 0–7% $GaF_3$, 0–7% $HfF_4$, 0–7% $InF_3$, 0–5% $LuF_3$,, 0–3% $CdCl_2$, and 0–5% CdS may be present. Also 0–2% $Nb_2O_5$ and 0–1% $LaF_3$ have been found to be compatible substitutions in the A and B glasses.

Differential scanning calorimetry (DSC) measurements of the inventive glasses have indicated a transition temperature in the vicinity of 400° C. and a sharp crystallization peak above 450° C. for most compositions. The temperature of the heat treatment required to convert the precursor glass to a glass-ceramic was determined after first observing the position of the crystallization peak from the DSC curve, and then exposing the glass to temperatures in the vicinity of that peak. The length of the exposure was dependent upon the temperature employed relative to the peak crystallization temperature, it being well known that crystallization occurs more rapidly at higher temperatures. Thus, the period of exposure could be as shod as a few minutes at elevated temperatures to many hours at temperatures below the peak crystallization temperature. Nevertheless, because crystal growth can be more closely controlled at lower temperatures to assure uniformly very fine-grained crystals, heat treatments of 2–8 hours, desirably about 4 hours, at temperatures slightly below the peak crystallization temperature were employed.

X-ray diffractive analyses have indicated the presence of a crystal phase which has not been positively identified. The crystal structure has been tentatively identified as a derivative of either $M_{(1-x)}(Y,Ln)_xF_{2+x}$, wherein M comprises Pb and/or Cd, or $(Pb, Cd)LnF_{3+x}$, each of which is a cubic fluorite-like crystal. (Ln refers to a rare earth metal of the lanthanide series.) In either case it indicates the site of the rare earth metal ion in the crystal.

X-ray diffraction analyses also indicated the size of the crystals to be about 100–300 Å (10–30 nm, 0.01–0.03 μm) and the crystal content of the material to be about 25–30% by volume. Those values were confirmed via transmission electron micrography.

The linear coefficients of thermal expansion of the inventive glass-ceramic materials over the temperature range of 25°–300° C. have been measured between about 95–112× $10^{-7}$/°C. The densities of the glass-ceramics range about 5.7–5.9 g/cm$^3$ and their refractive indices between about 1.74–1.76.

Where doped with Pr, fluorescence lifetimes in excess of 100 microseconds are the norm with some examples measuring up to about 160 microseconds, that value being more than 50% longer than exhibited by $Pr^{3+}$-doped SBLAN.

Pr is attractive as a dopant because it has an electron transition near 1300 nm, so it is ideal for fabricating optical amplifiers for the 1300 nm telecommunications window. Also reliable pump lasers are available.

It was found that fluorescence lifetimes were greater than 120 microseconds with $Pr^{3+}$ concentrations, in the base glasses, of up to about 500 ppm by weight(ppmw). A quenching effect began slightly above 500 ppmw and lifetimes continued an essentially linear decrease to about 70 microseconds at 900 ppmw. In general, longer fluorescent lifetimes improves the percent inversion of electron states and higher dopant concentrations increase the number of electrons which can be pumped to the higher state. Thus, long lifetime and high concentration are both desired.

In the instant case, lifetime becomes shorter when concentration becomes too large. A best case balance between these two parameters is achieved for $Pr^{+3}$ in the most preferred concentration range of about 200 to 550 ppmw. Florescence was observed over the concentration range of about 50 to 900 ppmw, so that the glass-ceramic is an active device at least over that range. Due to quenching effects at higher concentrations of $Pr^{+3}$, perhaps an active operating range of about 50 to 650 ppmw is more descriptive of the device functionality.

Hence, to produce amplifiers with higher gain or laser having higher intensity, a concentration in the range of about 50 ppmw to 650 ppmw is functional. We have shown that the glass-ceramic performs as an active device over a range of about 50 to 900 ppmw. A most preferred range is about 200 to 550 ppmw, which provides high gain amplifiers or high intensity laser light without substantially sacrificing fluorescent lifetime.

Thus the inventive glass-ceramic and the compatible covering or cladding glass described below can be formed into optically active devices, which may be optical amplifiers or lasers. These optically active devices comprise an elongated central member consisting essentially of either the A or B base glass and a compatible covering or cladding glass according to the composition consisting essentially, expressed in terms of weight percent on the oxide basis, of

| SiO$_2$ | 23–30 | B$_2$O$_3$ | 1–10 | Al$_2$O$_3$ | 0–3 |
|---|---|---|---|---|---|
| PbO | 49–60 | Li$_2$O | 0–1 | Na$_2$O | 0–2 |
| K$_2$O | 5–11 | BaO | 0–8 | | |

The central member may also be made up of metal oxides and metal fluorides chosen from the group consisting of 0–7% BO$_{1.5}$, 0–12% GeO$_2$, 0–7% PO$_{2.5}$, 0–3% TiO$_2$, 0–2% Nb$_2$O$_5$, 0–7% GaF$_3$, 0–7% HfF$_4$, 0–7% InF$_3$, 0–5% LuF$_3$, 0–1% LaF$_3$, 0–3% CdCl$_2$, and 0–5% CdS, which are substituted for the oxides and fluorides in the base glasses. About 17 cation % total substitution is acceptable. In general oxides and fluorides are substituted respectively for oxides and fluorides.

Another aspect of the invention is a method for making the optically active devices. A major difficulty encountered in the method is avoiding crystal formation during the forming step. The central member glasses described above will form crystals during the forming step if the glass remains too long at a temperature near the peak crystallization temperature.

Thus, if a double crucible technique is used, the elongated glass article, having a central member and a covering thereover, must be quickly cooled to a temperature below the peak crystallization temperature. In a double crucible technique both the center member glass and the transparent glass covering of the center member are each heated to a temperature in the range of about 800°–1300° C. This temperature varies depending upon central member glass composition but is readily determined by DSC or other methods well known in the art. In general the peak crystallization temperature lies in the range of about 400° to 500° C. The double crucible technique is well known in the art and is described in numerous references, such as, "Fabrication of Long Single Mode and Multimode Fluoride Glass Fibers by the Double Crucible Technique", Tokiwa et al., Electronics Letters, #24, V. 21, 1985.

The undesired crystal growth is suppressed by cooling the elongated glass article formed in the double crucible to a temperature below the crystallization temperature in about 1 minute.

If an extrusion technique is used, the glass article does not require quenching since extrusion can be done at a viscosity less than or equal to about $10^{9.5}$ poises, which about an order of magnitude above the viscosity whereat crystals can form.

The extrusion technique is also well documented in the art for example in, "Shaping of Glass Melts by Continuous Pull Extrusion", Rammo et al., Glastechnische Berichte, #3, V. 67, 1994.

If further shaping of the glass article is required after extrusion, a heating and quenching step would have to be added.

Once the glass article has reached its final shape, the crystallization process may be carried out at or near the peak crystallization temperature. (Note crystallization as used herein is equivalent to transforming a glass into a glass-ceramic. This temperature is desirable because of the control one has in determining the size, the number and the spacing of the crystals. Thus the preferred temperature in general is in the range of about 400° to 500° C. and the time at temperature may vary ½ to 24 hours. One may choose a temperature whereat the required crystallization is complete in 2–8 hours. Forming the glass-ceramic article is carried out using a double crucible technique wherein the center member glass and the transparent glass covering the center member are each heated to a temperature in the range of about 800–1300 C. degree during forming and the formed glass is quenched to a temperature below the peak crystallization temperature in a time of less than 1 minute. Forming the glass-ceramic article is carried out using an extrusion technique at a temperature in the range of 10 to 30 C. degree below the peak crystallization temperature to provide a viscosity for extrusion which is less than about $10^{9.5}$ Poises. The heating step is carried out using a pre-selected temperature near the peak crystallization temperature of the center member glass and the pre-selected time is in the range of about ½–24 hours.

The ends of the optically active glass-ceramic article are left uncovered to allow access to the central member, which is the optically active part of the article. Pump light or signal light may launched into the central member and received after passing through the central member as would be the case for an optical amplifier. If used as a laser pump light would be inserted into the central member and the laser light would emerge from one or both of the ends.

Prior Art

A. A. Kaminskii et al. in "Stimulated IR Emission of $Nd^{3+}$ Ions in Nonstoichiometric Cubic Fluorides", *Izvestiya Akademii Nauk SSSR, Neorganicheskie Materialy*, Vol. 21, No. 5, pages 702–705, May 1985, describe three methods for improving the energy characteristics of the stimulated emission of solid state inorganic materials with $Ln^{3+}$ ions; viz., the growth of multi-center disordered crystals based on structurally ordered compounds, increasing the concentration of the activator, and/or introducing sensitizing ions into active media of the types just described. The authors indicated that the first two methods had already been used to obtain $M_{1-x}(R,Ln)_xF_{2+x}$ solid solutions with a fluorite structure with $Nd^{3+}$ ions on the basis of $MF_2$ (where M is Ca, Sr, and/or Ba), the trifluorides $RF_3$ (where R is Y and/or Sc), and $LnF_3$, where Ln is La, Ce, Nd, Gd, and/or Lu). The work of the authors described in this paper was directed to the stimulated emission spectroscopy of $Nd^{3+}$ ions in the infrared region of the radiation spectrum in disordered fluorite phases based on $CdF_2$ and the trifluorides of gadolinium and lutetium, i.e., $Cd_{1-x}Ln-F_{2+x}$. There is no mention by the authors of a glass-ceramic article or of precursor glass compositions suitable for heat treatment to produce transparent glass-ceramic articles. They were dealing with conventional ceramic materials to grow single crystals. This paper and the literature article written by Wang et al. discussed above are believed to constitute the most pertinent prior art.

DESCRIPTION OF PREFERRED EMBODIMENTS

Table I below records a number of glass compositions expressed in terms of cation percent illustrating the present invention resulting from our laboratory investigations. Batches in 25 gram lots were prepared from pure oxides, fluorides, chlorides, and sulfides, hand tumbled to mix the components together, and then charged into 30 cm³ platinum crucibles.

Previous experimentation had established that the preferred $PrF_3$ concentration was in the range of about 200 to 550 ppmw. In these experimental melts, each batch was doped with 200 ppm $PrF_3$. The crucibles were moved into a furnace operating at temperatures between 1000°–1200° C. for 0.5 hour. All compounding, mixing, and melting were carried out in a glove box under dry nitrogen. Although these glasses do not require melting under inert conditions, safety concerns because of the high concentrations of cadmium led to the practice of confining the melts.

After melting, most compositions appeared to be clear, moderately fluid, quiescent liquids. When poured onto a steel block, the resultant slabs tended to break up into small fragments, the cause of the fragmentation being conjectured to be due to the formation of a few crystals therein. Larger bars having dimensions of 5×1×1 cm, could be cast without shattering, this capability being theorized to be due to a partial anneal received during cooling because of the larger volume of the article. A more thorough anneal was required when the material was to be cut and polished for testing As was observed above, the crystallization heat treatment applied to each glass sample was determined after the position of the crystalzation peak had been located from a DSC curve. The glass sample was heated to a temperature in the vicinity of the peak, the time of exposure being dependent upon the heat treatment temperature utilized vis-a-vis the peak crystallization temperature.

In Table I the glass compositions are founded in base glasses A and B with various substitutions of constituents being recorded in terms of cation percent. As noted above, the crystallization heat treatment comprises a range of temperatures centered about the peak crystallization temperature. Because each change in composition can shift both the Tg and peak crystallization temperature of a glass, the thermal processing of each material varies. The heat treatment range for each composition, expressed in terms of °C., encompasses the temperature interval between the onset of the crystallization peak to its terminus. The breadth of the heat treatment ranges for some of the compositions is reported in Table I. Finally, whether the crystallized product (Product) exhibited the demanded optical claritynd whether it contained extremely fine-grained crystals of a single phase are also recorded (yes/no).

TABLE I

| Example | Base Glass | Substitution | Heat Treatment | Product |
|---|---|---|---|---|
| 1002-27-1 1 | B | None | 442–463 | Yes |
| 1002-31-4 2 | A | None | 455–466 | Yes |
| 1002-3-3 3 | A | 7.5 ZnO for $Al_2O$ | | No |
| 1002-7-2 4 | A | 5 LiF for $PbF_2$ | | No |
| 1002-7-3 5 | A | 5 NaF for $PbF_2$ | | No |
| 1002-7-4 6 | A | 5 $ZrF_4$ for $PbF_2$ | | No |
| 1002-7-5 7 | A | 5 $HfF_4$ for $PbF_2$ | | Yes |
| 1002-7-6 8 | A | 5 $SnF_2$ for $PbF_2$ | | No |
| 1002-7-7 9 | A | 5 SnO for $SiO_2$ | | No |
| 1002-7-8 10 | A | 5 $ZrO_2$ for $SiO_2$ | | No |
| 1002-7-9 11 | A | 2.5 $Ta_2O_5$ for $SiO_2$ | | No |

TABLE I-continued

| Example | Base Glass | Substitution | Heat Treatment | Product |
|---|---|---|---|---|
| 1002-9-1 12 | A | 2.5 $Nb_2O_5$ for $SiO_2$ | | No |
| 1002-9-3 13 | A | 5 $GaF_3$ for $PbF_2$ | | Yes |
| 1002-11-1 14 | A | 2 $GdF_3$ for $PbF_2$ | | Yes |
| 1002-11-3 15 | A | 5 $LuF_3$ for $PbF_2$ | | Yes |
| 1002-11-4 16 | A | 2 $InF_3$ for $PbF_2$ | 439–456 | Yes |
| 1002-11-5 17 | A | 2 $NbO_{2.5}$ for $PbF_2$ | 410–451 | Yes |
| 1002-11-7 18 | A | 5 $PO_{2.5}$ for $SiO_2$ | 461–477 | Yes |
| 934-149-5 19 | B | 5 RbF for $ZnF_2$ | | No |
| 934-149-6 20 | B | 5 $SrF_2$ for $ZnF_2$ | | No |
| 934-149-7 21 | B | 5 $BaF_2$ for $ZnF_2$ | | No |
| 934-149-8 22 | B | 5 $CaF_2$ for $ZnF_2$ | | No |
| 934-149-9 23 | B | 5 $LaF_3$ for $ZnF_2$ | | No |
| 934-151-1 24 | B | 5 $InF_3$ for $ZnF_2$ | 469–492 | Yes |
| 934-151-2 25 | A | 5 $BO_{1.5}$ for $AlO_{1.5}$ | 403–420 | Yes |
| 934-151-3 26 | A | 10 $GeO_2$ for $SiO_2$ | 465–479 | Yes |
| 934-151-5 27 | A | 2.5 CdS for $CdF_2$ | 448–461 | Yes |
| 934-151-6 28 | A | 1 $TiO_2$ for $SiO_2$ | 445–458 | Yes |
| 1002-55-5 29 | B | 3 $CdCl_2$ for $CdF_2$ | 440–460 | Yes |

A chemical analysis was conducted on base glass B. The batch therefor was melted for 30 minutes at 1000° C. in a platinum crucible.

| Element | Batched Weight % | Melted Weight % |
|---|---|---|
| Si | 6.9 | 5.3 |
| Al | 3.3 | 3.6 |
| Cd | 26.7 | 28.9 |
| Pb | 28.9 | 30.6 |
| Y | 2.9 | 3.3 |
| Zn | 2.7 | 3.0 |
| F | 17.8 | 12.8 |

Those data suggest that essentially only Si and F were lost during melting. Inasmuch as the F/Si ratio loss approximates 4, it is believed logical to conclude that $SiF_4$ comprises the principal volatilization product under the present melting conditions.

The great resistance of the inventive glasses to devitrification permits the production of large preforms. Thus, crystallization at the interface between the core and cladding during the production of the preform is avoided in the most commonly used methods in preparing an optical fiber waveguide. That attribute led to investigations to discover cladding glasses exhibiting lower refractive indices than the inventive glass-ceramics, but demonstrating linear coefficients of thermal expansion, transition temperatures, and viscosity characteristics compatible with the inventive precursor glasses and glass-ceramics, so as to permit the fabrication of optical fiber waveguides.

We have found a family of glasses in the $K_2O$—PBO—$B_2O_3$—$SiO_2$ system which exhibit the necessary properties. Thus, they display refractive indices between 1.67–1.73, linear coefficients of thermal expansion over the temperature range of 25°–300° C. of 98–110×10$^{-7}$/°C., transition temperatures between 390°–425° C., and softening points between 475°–525° C. The composition ranges of operable glasses are set out below, expressed in terms of weight percent on the oxide basis, of

| $SiO_2$ | 23–30 | $B_2O_3$ | 1–10 | $Al_2O_3$ | 0–3 |
|---|---|---|---|---|---|
| PbO | 49–60 | $Li_2O$ | 0–1 | $Na_2O$ | 0–2 |
| $K_2O$ | 5–11 | BaO | 0–8 | | |

Examples of operable glass compositions, expressed in terms of weight percent on the oxide basis, are listed below in Table II. Also listed are the refractive index (η), the linear coefficient of thermal expansion (Exp) over the temperature range 25°–300° C. expressed in terms of ×10$^{-7}$/°C., and the softening point (S.P.) and transition temperature (Tg) expressed in terms of °C.

The batch ingredients were compounded in 1000 gram lots, thoroughly blended together in a turbula mixer, and charged into platinum crucibles. The crucibles were moved into a furnace operating at 1200° C. and the batches melted for three hours. The melts were cocktail mixed and then poured onto a steel plate to form glass patties having dimensions of about 6"×6"××0.5" (~15×15×1.25 cm). Finally, the patties were annealed at 400° C.

TABLE II

| | 1 | 2 | 3 | 4 | 5 | 6 |
|---|---|---|---|---|---|---|
| $SiO_2$ | 26.0 | 25.5 | 24.4 | 29.2 | 27.2 | 26.0 |
| PbO | 58.0 | 52.3 | 50.6 | 54.0 | 54.0 | 58.0 |
| $K_2O$ | 9.0 | 10.3 | 11.4 | 7.7 | 7.7 | 8.0 |
| $B_2O_3$ | 3.0 | 3.0 | 3.0 | 6.0 | 8.0 | 2.0 |
| $Li_2O$ | — | — | — | 0.5 | 0.5 | — |
| BaO | — | 4.9 | 6.6 | — | — | 2.0 |
| $Al_2O_3$ | 3.0 | 3.0 | 3.0 | — | — | 2.0 |
| $Na_2O$ | — | — | — | 1.6 | 1.6 | — |
| $Sb_2O_3$ | 1.0 | 1.0 | 1.0 | 1.0 | 1.0 | 1.0 |
| η | 1.722 | 1.713 | 1.713 | 1.699 | 1.701 | 1.7175 |
| Exp | 97–109 | 97–113 | 103–118 | 98–116 | 95–110 | 92–104 |
| S.P. | — | — | — | 504 | 502 | 550 |
| Tg | 425 | 423 | 426 | 399 | 398 | 421 |

$Sb_2O_3$ was included in the glasses to perform its conventional function as a fining agent. As can be appreciated, other fining agents such as $As_2O_3$, halides, and sulfates could be substituted therefor. As can be seen, minor amounts of $Li_2O$ and/or $Na_2O$ can be substituted for $K_2O$. Such substitutions can improve the chemical durability of the glasses. Likewise, a minor amount of BaO can be substituted for PbO to modify the refractive index of the glass. The most preferred transparent glass-ceramic consists of Glass B doped with an amount of $PrF_3$ in the range of about 200 to 550 ppmw.

What is claimed is:

1. An optically active glass-ceramic article comprising:
an elongated central member, having a first and a second end, consisting of, a transparent glass-ceramic essentially free from ZnO and $ZnF_2$ exhibiting high optical clarity and containing essentially only one crystal phase consisting essentially, expressed in terms of cation percent, of

| $SiO_2$ | 20–35 | $PbF_2$ | 19–23 |
|---|---|---|---|
| $AlO_{1.5}$ | 10–20 | $YF_3$ | 3–7 |

-continued

| | |
|---|---|
| CdF$_2$ | 19–34 | and Pr$^{+3}$ at a concentration in the range of about 50 to 650 PPMW;

and, a transparent glass covering the surface of said elongated central member, but leaving exposed said first and second ends, consisting essentially, expressed in terms of weight percent on the oxide basis, of

| | | | | | |
|---|---|---|---|---|---|
| SiO$_2$ | 23–30 | B$_2$O$_3$ | 1–10 | Al$_2$O$_3$ | 0–3 |
| PbO | 49–60 | Li$_2$O | 0–1 | Na$_2$O | 0–2. |
| K$_2$O | 5–11 | BaO | 0–8 | | |

2. The optically active glass-ceramic article according to claim 1 wherein the concentration of Pr$^{+3}$ is in the range of about 20014 550 ppmw.

3. An optically active glass-ceramic article according to claim I also containing in said central member up to 17 cation percent total of at least one component selected from the group consisting of 0–7% BO$_{1.5}$, 0–12% GeO$_2$, 0–7% PO$_{2.5}$, 0–3% TiO$_2$, 0–2% Nb$_2$O$_5$, 0–7% GaF$_3$, 0–7% HfF$_4$, 0–7% InF$_3$, 0–5% LuF$_3$,, 0–1 LaF$_3$, 0–3% CdCl$_2$, and 0–5% CdS.

4. An optically active glass-ceramic article according to claim 3 wherein said optically active glass-ceramic article is an optical waveguide fiber amplifier.

5. An optically active glass-ceramic article according to claim 3 wherein said optically active glass-ceramic article is a laser.

6. An optically active glass-ceramic article comprising:

an elongated central member, having a first and a second end, consisting of a transparent glass-ceramic exhibiting high optical clarity and containing essentially only one crystal phase consisting essentially, expressed in terms of cation percent, of

| | | | |
|---|---|---|---|
| SiO$_2$ | 20–35 | PbF$_2$ | 15–25 |
| AlO$_{1.5}$ | 10–20 | YF$_3$ | 3–7 |
| CdF$_2$ | 21–31 | ZnF$_2$ | 3–7 | and Pr$^{+3}$ at a concentration in the range of about 50 to 650 ppmw;

and, a transparent glass covering the surface of said elongated central member, but leaving exposed said first and second ends, consisting essentially, expressed in terms of weight percent on the oxide basis, of

| | | | | | |
|---|---|---|---|---|---|
| SiO$_2$ | 23–30 | B$_2$O$_3$ | 1–10 | Al$_2$O$_3$ | 0–3 |
| PbO | 49–60 | Li$_2$O | 0–1 | Na$_2$O | 0–2 |
| K$_2$O | 5–11 | BaO | 0–8. | | |

7. The optically active glass-ceramic article according to claim 6 wherein the concentration of Pr$^{3+}$is in the range of about 200–550 ppmw.

8. An optically active glass-ceramic article according to claim 6 also containing in said central member up to 17 cation percent total of at least one component selected from the group consisting of 0–7% BO$_{1.5}$, 0–12% GeO$_2$, 0–7% PO$_{2.5}$, 0–3% TiO$_2$, 0–2 Nb$_2$O$_5$, 0–7% GaF$_3$, 0–7% HfF$_4$, 0–7% InF$_3$, 0–5% LuF$_3$, 0–1 LaF$_3$, 0–3% CdCl$_2$, and 0–5% CdS.

9. An optically active glass-ceramic article according to claim 6 wherein said optically active glass-ceramic article is an optical waveguide fiber amplifier.

10. An optically active glass-ceramic article according to claim 6 wherein said optically active glass-ceramic article is a laser.

11. A method of making an optically active glass-ceramic article comprising the steps:

forming an elongated glass body, having a first and a second end, a center member consisting of a transparent glass essentially free from ZnO and ZnF$_2$ consisting essentially, expressed in terms of cation percent, of

| | | | |
|---|---|---|---|
| SiO$_2$ | 20–35 | PbF$_2$ | 19–23 |
| AlO$_{1.5}$ | 10–20 | YF$_3$ | 3–7 |
| CdF$_2$ | 19–34 | | | and Pr$^{+3}$ at a concentration in the range of about 50 to 650 ppmw;

and, a transparent glass covering the surface of said elongated central member, but leaving exposed said first and second ends, consisting essentially, expressed in terms of weight percent on the oxide basis, of

| | | | | | |
|---|---|---|---|---|---|
| SiO$_2$ | 23–30 | B$_2$O$_3$ | 1–10 | Al$_2$O$_3$ | 0–3 |
| PbO | 49–60 | Li$_2$O | 0–1 | Na$_2$O | 0–2 |
| K$_2$O | 5–11 | BaO | 0–8; and, | | | heating said elongated glass body at a pre-selected temperature for a preselected time, to transform said center glass member into a transparent glass-ceramic exhibiting high optical clarity and containing essentially only one crystal phase.

12. The optically active glass-ceramic article according to claim 11 wherein the concentration of Pr$^{+3}$ is in the range of about 200–550 ppmw.

13. The method according to claim 11 wherein said central member also contains up to 17 cation percent total of at least one component selected from the group consisting of 0–7% BO$_{1.5}$, 0–12% GeO$_2$, 0–7% PO$_{2.5}$, 0–3% TiO$_2$, 0–7% GaF$_3$, 0–2% Nb$_2$O$_5$, 0–7% HfF$_4$, 0–7% InF$_3$, 0–5% LuF$_3$,, 0–1% LaF$_3$, 0–3% CdCl$_2$, 0–5% CdS.

14. The method according to claim 11 wherein said forming step is carried out using a double crucible technique wherein the said center member glass and said transparent glass covering said center member are each heated to a temperature in the range of about 800°1300° C. during forming and the formed glass is quenched to a temperature below the peak crystallization temperature in a time of less than 1 minute.

15. The method according to claim 11 wherein said forming step is carried out using an extrusion technique at a temperature in the range of 10° to 30° C. below the peak crystallization temperature to provide a viscosity for extrusion which is less than about 10$^{9.5°}$ poises.

16. The method according to claim 11 wherein said heating step is carried out using a pre-selected temperature near the peak crystallization temperature of said central member glass and the pre-selected time is in the range of about ½–24 hours.

17. A method of making an optically active glass-ceramic article comprising the steps:

forming an elongated glass body, having a first and a second end, a center member consisting of a transparent glass consisting essentially, expressed in terms of cation percent, of

| | | | |
|---|---|---|---|
| SiO₂ | 20–35 | PbF₂ | 15–25 |
| AlO₁.₅ | 10–20 | YF₃ | 3–7 |
| CdF₂ | 21–31 | ZnF₂ | 3–7 | and $Pr^{+3}$ at a concentration in the range of about 50 to 650 ppmw;

and, a transparent glass covering the surface of said elongated central member, but leaving exposed said first and second ends, consisting essentially, expressed in terms of weight percent on the oxide basis, of

| | | | | | |
|---|---|---|---|---|---|
| SiO₂ | 23–30 | B₂O₃ | 1–10 | Al₂O₃ | 0–3 |
| PbO | 49–60 | Li₂O | 0–1 | Na₂O | 0–2 |
| K₂O | 5–11 | BaO | 0–8; and, | | | heating said elongated glass body at a pre-selected temperature for a preselected time, to transform said center glass member into a transparent glass-ceramic exhibiting high optical clarity and containing essentially only one crystal phase.

18. The optically active glass-ceramic article according to claim 17 wherein the concentration of $Pr^{+3}$ is in the range of about 200–550 ppmw.

\* \* \* \* \*